United States Patent

[11] 3,627,404

| [72] | Inventor | Wen-Chung Wang<br>25 Trescott Path, Northport, N.Y. 11768 |
|---|---|---|
| [21] | Appl. No. | 803,623 |
| [22] | Filed | Mar. 3, 1969 |
| [45] | Patented | Dec. 14, 1971 |

[54] ELECTRICAL FOCUSING DEVICE
5 Claims, 6 Drawing Figs.

[52] U.S. Cl. .................................................. 350/160, 350/175 GN, 350/186
[51] Int. Cl. .................................................. G02f 1/28
[50] Field of Search ........................................ 350/160, 162 ZP, 175 DR, 184, 186, 194, 204, 175 GN

[56] References Cited

UNITED STATES PATENTS

| 3,447,867 | 6/1969 | Nerwin | 352/140 |
| 3,485,553 | 12/1969 | Lee | 350/160 |
| 3,238,843 | 3/1966 | Heller | 350/160 |
| 3,271,578 | 9/1966 | Bockemuehl | 350/160 |
| 3,309,162 | 3/1967 | Kosanke et al. | 350/160 |
| 3,317,266 | 5/1967 | Heller et al. | 350/160 |
| 3,520,592 | 7/1970 | Leib et al. | 350/175 DR |

OTHER REFERENCES

Yoshino et al., " Laser Induced Photoconductivity in CdS XTAL," Japan J. Appl. Phys., 4, 1965, 312– 313

Maeda et al., " Behavior of CdS XTALS Under Laser Light Excitation," Appl. Phys. Ltrs., Vol. 9, No. 2, 7/15/66, pp. 92– 94

Kalibijian et al., " Laser Deflection Modulation in a CdS Prism," J. Proc. IEEE, 5, 1965, pg. 539

*Primary Examiner* — Ronald L. Wibert
*Assistant Examiner* — J. Rothenberg
*Attorney* — Darby & Darby

ABSTRACT: A device for focusing light comprises a transparent photoconductor plate and means for applying a direct voltage across the plate. When the voltage is at a sufficient level, the focal point relative to the plate can be changed.

INVENTOR
WEN-CHUNG WANG

BY Darby & Darby

ATTORNEYS

INVENTOR
WEN-CHUNG WANG

BY Darby + Darby

ATTORNEYS

ELECTRICAL FOCUSING DEVICE

This invention relates to the focusing of light by electrical means. It is based upon the discovery that certain materials have an optical effect upon light passing therethrough if a suitable direct voltage is applied to the material. Devices incorporating the invention may be used as electronic lenses or as light modulating means as described below.

Figure 1:
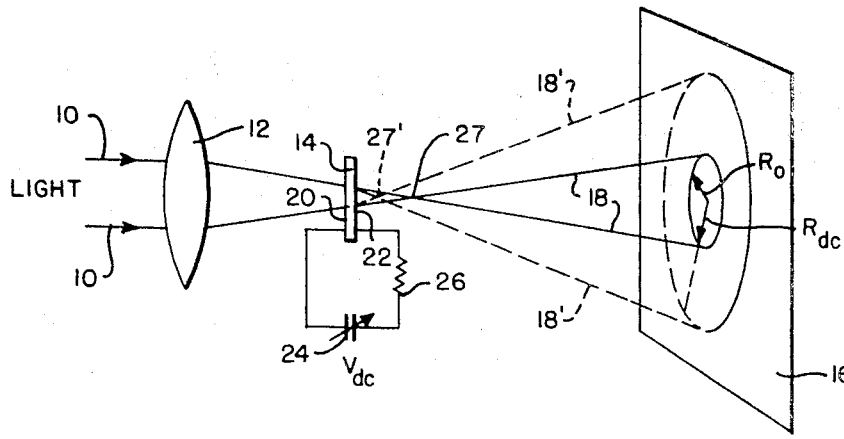
FIG. 1 is a diagrammatic illustration of the invention.

In FIG. 1, light rays are shown at 10 passing through a converging lens 12 to a transparent photoconductor plate 14. The light 10 may be provided by a Helium Neon laser or it may comprise collimated white light. A screen 16 serves to detect the light passing through plate 14 as represented by beams 18 which cause a circle of light of radius $R_0$ on the screen 16.

Photoconductive plate 14 may consist of cadmium sulfide (Cds) which is sulfur-compensated (to reduce electrical conductivity) as is conventional, with dimensions of 0.1×0.3×0.3 cubic centimeters. The two major surfaces of plate 14 are optically polished and parallel, and contain transparent electrodes 20 and 22. Electrodes 20 and 22 may be formed by diffusing indium on the plate surfaces at 500° C. for 1 hour in a closed tube at a pressure of $10^{-6}$ mm. mercury.

A direct voltage is applied to electrodes 20 and 22 from a variable DC source 24 (e.g., batteries or a pulse source) which includes a current limiting resistor 26. When a voltage is applied from source 24 across plate 14, a focusing effect on the light rays 18 can be observed. That is, as voltage is increased, the focal point 27 "moves" toward plate 14, for example, to point 27' while, of course, the rays 18 diverge further as shown by 18' so that the circle of light on screen 16 expands to a radius of $R_{dc}$. Thus, the effect of the direct voltage is to cause the photoconductor plate 14 to act as a lens in the sense that it focuses the incoming light. If the focal point 27 is in "front" of plate 14 (for example, due to positioning of lens 12), the application of the direct voltage to plate 14 will cause the light circle on screen 16 to decrease in radius as the focal point moves toward plate 14.

As noted in further detail below, the reasons why the focusing effect as described herein occurs are not known. It is believed that the effect may be caused by heating of the photoconductor or, possibly to a lesser extent, to the presence of ultrasonic waves in the photoconductor. Also, it is possible that a change in the impurity absorption of the light may have some effect. Before considering such theories of operation, the following experimental observations are offered.

Figure 2:
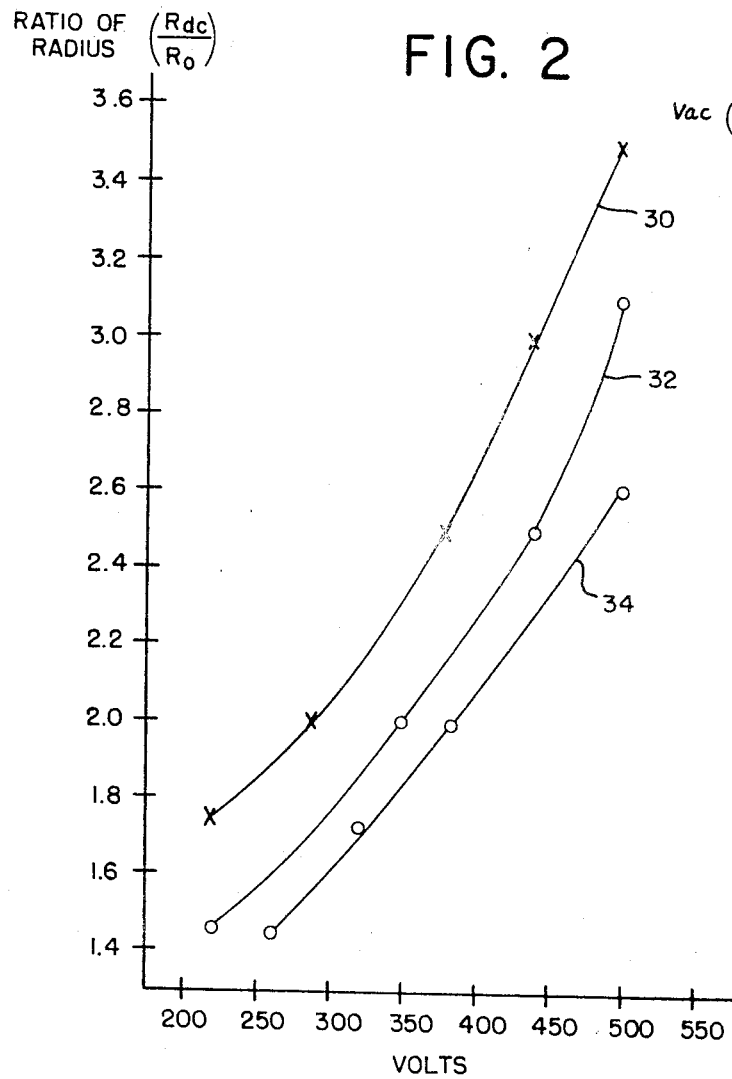
FIG. 2 is a graph showing the effect of voltage on the beam radius.

FIG. 2 is a plot of beam radius on the screen versus applied voltage for a photoconductor plate of dimension 0.3 (thickness)×.2×0.2 (cm.)³ with its thickness along the C-axis (i.e., the optical axis). Curves 30 and 32 were measured during the application of pulses from source 24 at two different crystal resistances, 15,000 ohms and 40,000 ohms, respectively. The pulses were 5 msec. long with a 15 msec. period. Curve 34 was measured under DC conditions at a resistance of 40,000 ohms.

Figure 3A:
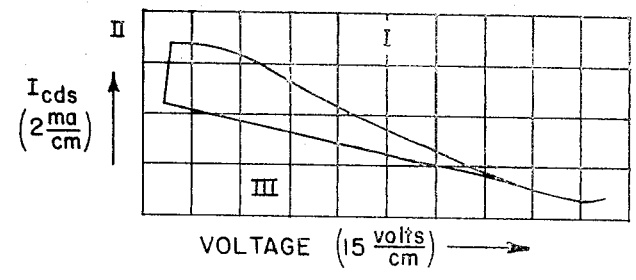
FIGS. 3a, 3b and 3c are curves illustrating a voltage-current hysteresis effect of a preferred embodiment.
Figure 3B:
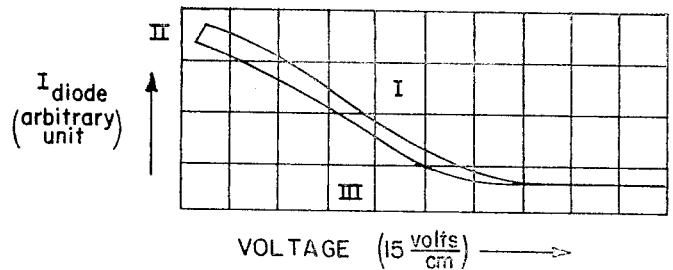
Figure 3C:
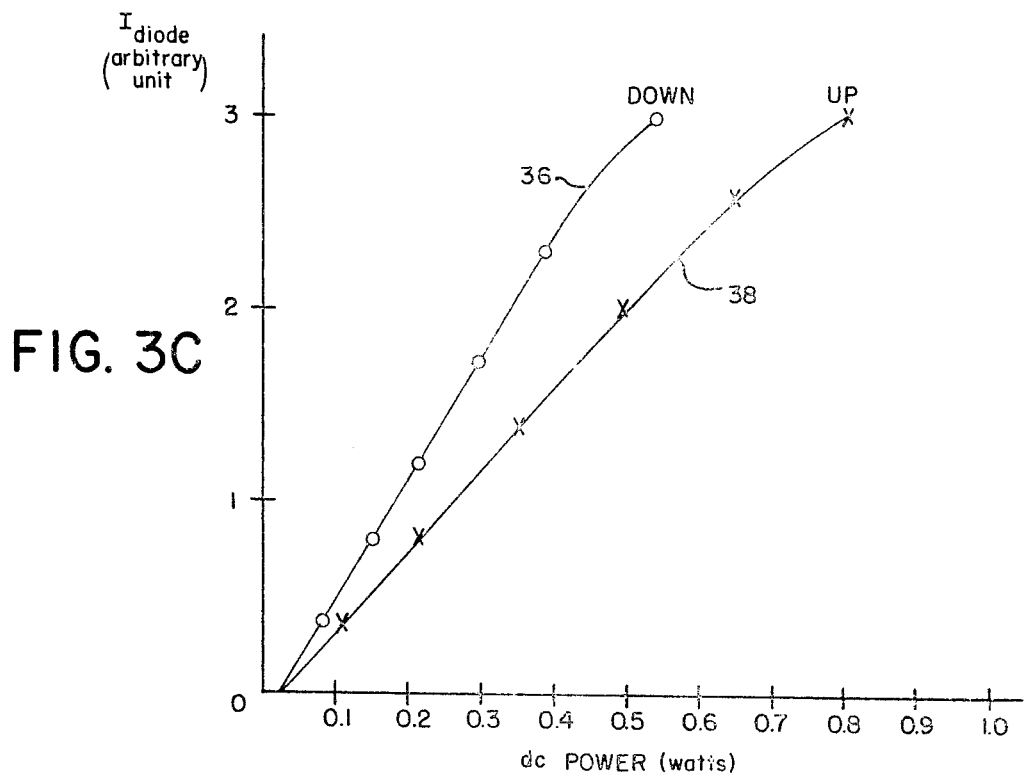

The samples exhibit time-dependent hysteresis in their V–I characteristics. FIG. 3a shows the DC voltage across the CdS plate [0.1 (thickness)×0.2×0.2 cm.³] versus the current passing through it, $I_{cds}$. FIG. 3b is the same DC voltage versus the current detected by a photodiode at the screen, $I_{diode}$. The upper portion of the curve, designated by I, is taken as the voltage increases at a rate of about 30 volts per second. II is the portion where voltage is set approximately constant for 1 minute. And III, the lower portion of the curve, is taken as the voltage decreases at a rate of about 30 volts per second. It is noted that a smaller hysteresis is present at FIG. 3b. Four factors are believed to be responsible for the observed V–I characteristics; the acoustoelectric current associated with sound generation, the decrease in mobility due to heating, the poor ohmic contact, and charge recombination on the plate surfaces. FIG. 3c which is derived from FIGS. 3a and 3b is the plot of power ($VI_{cds}$) against $I_{diode}$.

A silicon photodiode of wafer size less than 1 mm.² and frequency response up to 2 GC was used in place of the screen and the pulses of 5 msec. long and 15 msec. period were used. It was found that the typical rise-time detected by the photodiode is about 0.2 msec. and the decay-time is about 1.5 msec. In many instances, the response time is also found to be voltage dependent.

No change was observed as the polarity of the applied DC voltage is reversed, or as the polarization direction of the laser beam was changed. The focusing effect also seems to be independent of crystal orientation. The total light transmitted through the CdS plate was measured before and after the DC voltage was applied; the change in light transmission is less than 2 percent. It was observed that the focusing effect becomes more pronounced when the plate thickness, light intensity, or the DC field intensity is increased.

Where a piezoelectric crystal (such as CdS) is employed as the photoconductor 14, it is possible for the electric field to set up quasi-standing ultrasonic waves in the material. In many cases, the focusing effect started before sound was generated in the crystal. However, once strong ultrasound is generated, its presence is often demonstrated by instability of the focused beam. Such instability may result from mode shifting of the ultrasonic wave.

The threshold field of the focusing effect was found to be inconsistent among different samples. Some appeared to have a definite threshold, others did not. In general, the threshold is less than the threshold field for sound generation and decreases as the light intensity increases.

Figure 1A:
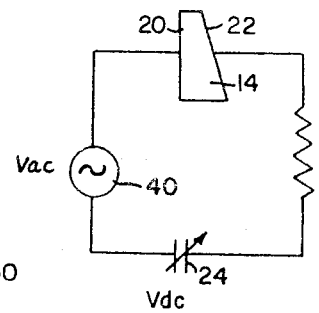
FIG. 1a is a diagrammatic illustration of a modification of the preferred embodiment of the invention.

When the thickness of the CdS plate is tapered to an angle of about 30° (see FIG. 1a), the focusing effect is still observed. However, a much longer response time in the photodiode current was also observed. In the case of tapered thickness, the center of the laser beam is shifted as the DC voltage is applied.

If the lens of FIG. 1 is preplaced by a pinhole, it is found that when the applied DC power is kept constant, the focusing effect becomes stronger as the radius of the pinhole decreases.

Although the reasons for the optical effect described herein are not fully understood, the following discussion is presented as the possible theory behind the operation of the invention.

Since the photoconductivity of the CdS plate is controlled by the laser intensity, the crystal conductivity will not be uniform but will have a distribution similar to that of the laser beam intensity, that is, highest along the beam center. When the DC voltage is applied, heat generated inside the crystal will also be expected to have a radial distribution like that of the conductivity; i.e., more heat will be generated at the beam center. Since the cross section of the CdS plate is very much larger than the beam radius, it acts as a very good heat sink. It is known that the temperature dependence of the refractive index of CdS (dn/dT) is about $5×10^{-4}$. To produce a change of $10^{-4}$ in the refractive index, from the beam center to the beam edge, requires a change in temperature of 0.2°. In view of having an efficient heat sink and a large amount of DC power dissipated, it appears possible that such a temperature difference is generated between the beam center and beam edge. This explanation appears not to contradict the experimental observations.

Where the beam intensity is nonuniform, i.e., of greater intensity at the center, the presence of quasi-standing ultrasonic waves may give rise to a higher effective index of refraction in the region of highest sonic density which would cause the beam to bend toward the beam center.

The voltage-dependence of response time seems to suggest that a change in the impurity absorption of the laser light may be caused by the application of a DC field,; however, its contribution should be fairly small inasmuch as the total light transmission does not change by more than 2 percent.

In addition to its use as a variable $f$ optical lens, the invention may also be used as a light modulator. Thus, if an alternating voltage (or other modulating signal) is properly impressed by an AC source 40 (FIG. 1a) on the bias of source 24 so as to cyclically focus the light output as a function of the alternating voltage, the intensity of the light as measured at a single point would also vary accordingly; and, of course, would be readily detectable. Other photoconductor materials (such as Zinc Oxide and Lithium Niobate) can be used in place of cadmium sulfide. To the extent the phenomenon depends on the existence of ultrasonic waves, it is necessary to use a piezoelectric material. Numerous other modifications and uses of the invention will also be obvious to those skilled in the art.

What is claimed is:

1. A device for focusing a light beam, comprising a transparent substantially flat body of photoconductive semiconductor material, said body having optical properties which vary in response to electrical current flow therein;

light-transmitting electrodes disposed on opposite surfaces of said body;

means for applying an electrical current, to said body by way of said electrodes, the resulting current flow in said body being sufficient to appreciably affect the refractive index of said material, and means for directing an intense light beam through said body and electrodes, with the cross-sectional intensity of the beam being maximum at its center and decreasing toward its edge, the interaction of said beam and current flow causing a nonuniform distribution of the index of refraction of said material over the area thereof intersected by said beam whereby the beam is focused at a point, the distance between said point and said body depending upon the magnitude of said applied current.

2. A device according to claim 1, wherein said photoconductive material is also piezoelectric.

3. A device according to claim 1, wherein said photoconductive material comprises cadmium sulfide.

4. A device according to claim 1, wherein said body is tapered as measured in the direction in which the light beam passes therethrough.

5. A device according to claim 1, including means for impressing an alternating voltage on said direct voltage to modulate said light beam by focusing the beam as a function of said alternating voltage.

* * * * *